United States Patent
Busscher et al.

(10) Patent No.: US 10,167,073 B2
(45) Date of Patent: Jan. 1, 2019

(54) MULTI-PIECE BEZEL FOR ELECTRO-OPTIC WINDOW ASSEMBLY

(71) Applicant: Gentex Corporation, Zeeland, MI (US)

(72) Inventors: Bradley L. Busscher, Grand Rapids, MI (US); David I. Driscoll, Caledonia, MI (US); Andrew T. Mitchell, Hudsonville, MI (US); Kevin L. Ash, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/178,216

(22) Filed: Jun. 9, 2016

(65) Prior Publication Data
US 2016/0362169 A1 Dec. 15, 2016

Related U.S. Application Data

(60) Provisional application No. 62/173,125, filed on Jun. 9, 2015.

(51) Int. Cl.
*B64C 1/14* (2006.01)
*E06B 3/54* (2006.01)
(Continued)

(52) U.S. Cl.
CPC .......... *B64C 1/1492* (2013.01); *B64C 1/1484* (2013.01); *E06B 1/006* (2013.01);
(Continued)

(58) Field of Classification Search
CPC ....... B64C 1/1492; B64C 1/1484; E06B 3/54; E06B 9/24; E06B 3/5454; E06B 2003/5472; E06B 2009/2464
See application file for complete search history.

(56) References Cited

U.S. PATENT DOCUMENTS 1,619,631 A * 3/1927 Patasnik ............... E06B 3/5885
52/204.62
3,517,434 A * 6/1970 Shaver ................... B21D 39/03
228/254
(Continued)

FOREIGN PATENT DOCUMENTS

DE 3202346 A * 11/1983
EP 0947874 6/1999
(Continued)

OTHER PUBLICATIONS

R. Sullivan et al., "Effect of Switching Control Strategies on the Energy Performance of Electrochromic Windows," SPIE, vol. 2255, pp. 443-455.

(Continued)

*Primary Examiner* — Jeanette E Chapman
(74) *Attorney, Agent, or Firm* — Price Heneveld LLP; Bradley D. Johnson

(57) ABSTRACT

A window mounting assembly includes a multi-piece bezel having a first portion having an attachment feature, and a second portion having a retention feature. The retention feature is configured to engage the attachment feature such that an inner opening is defined having an inner wall. The inner wall defines a channel. An electro-optic element is disposed in the opening and configured for reception in the channel of the inner wall.

18 Claims, 11 Drawing Sheets

(51) Int. Cl.
*E06B 9/24* (2006.01)
*E06B 1/00* (2006.01)

(52) U.S. Cl.
CPC .............. *E06B 3/54* (2013.01); *E06B 3/5454* (2013.01); *E06B 9/24* (2013.01); *E06B 2003/5472* (2013.01); *E06B 2009/2464* (2013.01)

(56) References Cited

U.S. PATENT DOCUMENTS

| | | | |
|---|---|---|---|
| 3,521,941 A | 7/1970 | Deb et al. | |
| 4,450,661 A * | 5/1984 | Whitener | B64C 1/1484 244/120 |
| 4,640,583 A | 2/1987 | Hoshikawa et al. | |
| 4,646,158 A | 2/1987 | Ohno et al. | |
| 4,702,566 A | 10/1987 | Tukude | |
| 4,893,908 A | 1/1990 | Wolf et al. | |
| 4,917,477 A | 4/1990 | Bechtel et al. | |
| 5,004,961 A | 4/1991 | Berner et al. | |
| 5,066,111 A | 11/1991 | Singleton et al. | |
| 5,092,939 A | 3/1992 | Nath et al. | |
| 5,124,832 A | 6/1992 | Greenberg et al. | |
| 5,136,419 A | 8/1992 | Shabrang | |
| 5,161,048 A | 11/1992 | Rukavina | |
| 5,202,787 A | 4/1993 | Byker et al. | |
| 5,228,925 A | 7/1993 | Nath et al. | |
| 5,271,581 A * | 12/1993 | Irish | B64C 1/1492 244/129.3 |
| 5,384,578 A | 1/1995 | Lynam et al. | |
| 5,384,653 A | 1/1995 | Benson et al. | |
| 5,612,847 A | 3/1997 | Malecke et al. | |
| 5,654,736 A | 8/1997 | Green et al. | |
| 5,657,149 A | 8/1997 | Buffat et al. | |
| 5,668,663 A | 9/1997 | Varaprasad et al. | |
| 5,724,176 A | 3/1998 | Nishikitani et al. | |
| 5,724,187 A | 3/1998 | Varaprasad et al. | |
| 5,725,809 A | 3/1998 | Varaprasad et al. | |
| 5,805,330 A | 9/1998 | Byker et al. | |
| 5,838,483 A | 11/1998 | Teowee et al. | |
| 5,889,608 A | 3/1999 | Buffat et al. | |
| 5,940,201 A | 8/1999 | Ash et al. | |
| 5,983,593 A * | 11/1999 | Carbary | E06B 3/6715 156/109 |
| 5,995,273 A | 11/1999 | Chandrasekhar | |
| 6,020,989 A | 2/2000 | Watanabe | |
| 6,045,643 A | 4/2000 | Byker et al. | |
| 6,045,724 A | 4/2000 | Varaprasad et al. | |
| 6,055,089 A | 4/2000 | Schultz et al. | |
| 6,056,410 A | 5/2000 | Hoekstra et al. | |
| 6,084,702 A | 7/2000 | Byker et al. | |
| 6,137,620 A | 10/2000 | Guarr et al. | |
| 6,166,496 A | 12/2000 | Lys et al. | |
| 6,207,083 B1 | 3/2001 | Varaprasad et al. | |
| 6,210,008 B1 | 4/2001 | Hoekstra et al. | |
| 6,239,898 B1 | 5/2001 | Byker et al. | |
| 6,245,262 B1 | 6/2001 | Varaprasad et al. | |
| 6,254,003 B1 | 7/2001 | Pettinelli et al. | |
| 6,407,847 B1 | 6/2002 | Poll et al. | |
| 6,433,913 B1 | 8/2002 | Bauer et al. | |
| 6,433,914 B1 | 8/2002 | Lomprey et al. | |
| 6,471,360 B2 | 10/2002 | Rukavina et al. | |
| 6,567,708 B1 | 5/2003 | Bechtel et al. | |
| 6,597,489 B1 | 7/2003 | Guarr et al. | |
| 6,621,616 B1 | 9/2003 | Bauer et al. | |
| 6,770,068 B2 | 8/2004 | Ruiz et al. | |
| 6,783,099 B2 * | 8/2004 | Rukavina | B64C 1/1484 244/119 |
| 6,787,204 B2 * | 9/2004 | Chaussade | B64C 1/1492 174/391 |
| 6,853,472 B2 | 2/2005 | Warner et al. | |
| 6,906,632 B2 | 6/2005 | DeLine et al. | |
| 6,924,919 B2 | 8/2005 | Hunia et al. | |
| 6,946,315 B2 * | 9/2005 | Ikeda | B81C 1/00611 257/415 |
| 6,961,168 B2 | 11/2005 | Agrawal et al. | |
| 6,963,437 B2 | 11/2005 | Bauer et al. | |
| 7,085,609 B2 | 8/2006 | Bechtel et al. | |
| 7,130,101 B2 | 10/2006 | Rukavina et al. | |
| 7,256,923 B2 | 8/2007 | Liu et al. | |
| 7,256,924 B2 | 8/2007 | Guarr | |
| 7,274,501 B2 | 9/2007 | McCabe et al. | |
| 7,397,595 B2 | 7/2008 | Kojima | |
| 7,428,091 B2 | 9/2008 | Baumann et al. | |
| 7,450,291 B2 | 11/2008 | Guarr et al. | |
| 7,471,438 B2 | 12/2008 | McCabe et al. | |
| 7,502,156 B2 | 3/2009 | Tonar et al. | |
| 7,525,714 B2 | 4/2009 | Poll et al. | |
| 7,535,614 B1 | 5/2009 | Tapley et al. | |
| 7,822,490 B2 | 10/2010 | Bechtel et al. | |
| 7,855,821 B2 | 12/2010 | Baumann et al. | |
| 7,990,603 B2 | 8/2011 | Ash et al. | |
| 8,169,684 B2 | 5/2012 | Bugno et al. | |
| 8,499,508 B2 * | 8/2013 | Sonderkær | E06B 3/66 52/204.593 |
| 9,403,590 B2 * | 8/2016 | Driscoll | B64C 1/1492 |
| 9,714,078 B2 | 7/2017 | Ebner et al. | |
| 9,976,726 B2 * | 5/2018 | Ash | F21V 14/08 |
| 2002/0113168 A1 * | 8/2002 | Rukavina | B64C 1/1484 244/129.3 |
| 2003/0234322 A1 * | 12/2003 | Bladt | B64C 1/1484 244/129.3 |
| 2004/0160660 A1 | 8/2004 | Malvino | |
| 2004/0229607 A1 * | 11/2004 | La Chapelle | B64C 1/1492 455/431 |
| 2005/0063036 A1 | 3/2005 | Bechtel et al. | |
| 2005/0150589 A1 | 7/2005 | Amos et al. | |
| 2005/0156753 A1 | 7/2005 | DeLine et al. | |
| 2005/0200933 A1 | 9/2005 | Weidner | |
| 2005/0200935 A1 | 9/2005 | Liu et al. | |
| 2005/0270621 A1 | 12/2005 | Bauer et al. | |
| 2007/0137117 A1 * | 6/2007 | Carlson | B64C 1/1492 52/204.1 |
| 2007/0285759 A1 | 12/2007 | Ash et al. | |
| 2008/0030836 A1 | 2/2008 | Tonar et al. | |
| 2008/0066971 A1 | 3/2008 | Whang et al. | |
| 2009/0015736 A1 | 1/2009 | Weller et al. | |
| 2010/0085511 A1 | 4/2010 | Watanabe et al. | |
| 2010/0230543 A1 * | 9/2010 | Bruce | B05B 15/0462 244/129.3 |
| 2011/0255142 A1 | 10/2011 | Ash et al. | |
| 2013/0161971 A1 * | 6/2013 | Bugno | B60J 3/04 296/97.2 |
| 2013/0278989 A1 | 10/2013 | Lam et al. | |
| 2014/0268288 A1 * | 9/2014 | Driscoll | E06B 9/24 359/275 |
| 2015/0138622 A1 * | 5/2015 | Driscoll | B64C 1/1492 359/275 |
| 2015/0146277 A1 | 5/2015 | Ash | |

FOREIGN PATENT DOCUMENTS

| | | |
|---|---|---|
| EP | 0947875 | 6/1999 |
| EP | 0947876 | 6/1999 |
| SU | 969870 A1 | 10/1982 |
| WO | 8301237 A1 | 4/1983 |
| WO | 9857228 | 12/1998 |

OTHER PUBLICATIONS

A.W. Czanderna et al., "Durability Issues and Service Lifetime Prediction of Electrochromic Windows for Buildings Applications," Solar Energy Materials & Solar Cells, 56 (1999), pp. 419-436.

\* cited by examiner

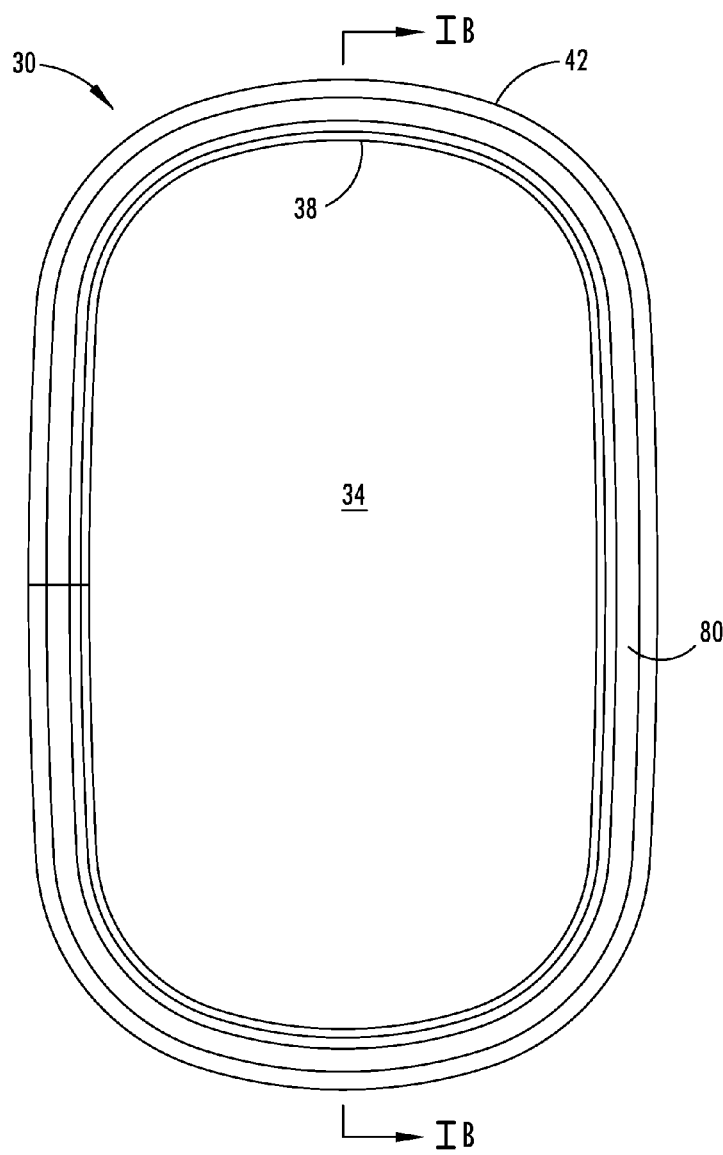
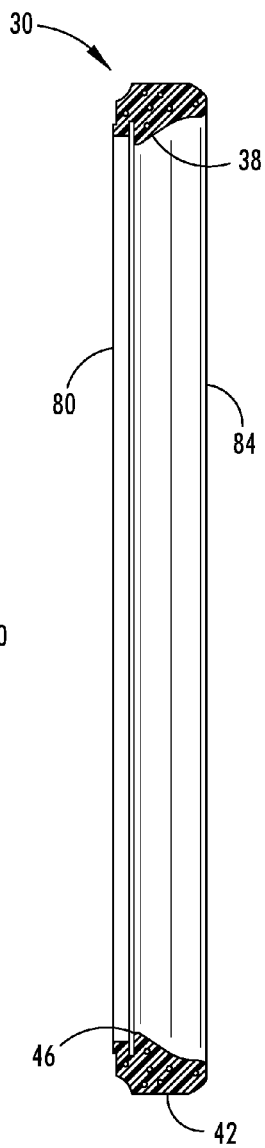
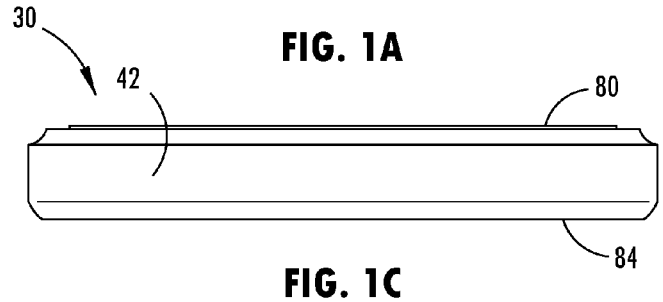
FIG. 1A
FIG. 1B
FIG. 1C

US 10,167,073 B2

MULTI-PIECE BEZEL FOR ELECTRO-OPTIC WINDOW ASSEMBLY

CROSS-REFERENCE TO RELATED APPLICATIONS

This application claims the benefit of and priority to U.S. Provisional Patent Application No. 62/173,125, filed on Jun. 9, 2015, entitled "MULTI-PIECE BEZEL FOR ELECTRO-OPTIC WINDOW ASSEMBLY," the entire disclosure of which is hereby incorporated herein by reference.

FIELD OF THE DISCLOSURE

The present disclosure generally relates to an aircraft window mounting assembly, and more specifically, to an aircraft window mounting assembly that includes an electro-optic element.

BACKGROUND OF THE DISCLOSURE

Aircraft window foam mounting assemblies are being used for the attachment of variable transmissive windows to aircraft. Use of these assemblies may result in increased manufacturing time, cost, and weight of the aircraft. Accordingly, new mounting assembly designs and configurations, along with methods of making them, are needed particularly in view of reducing material and processing costs, improving aesthetics and/or enhancing functionality.

SUMMARY OF THE PRESENT DISCLOSURE

According to one aspect of the present disclosure, a window mounting assembly includes a multi-piece bezel having a first portion having an attachment feature, and a second portion having a retention feature. The retention feature is configured to engage the attachment feature such that an inner opening is defined having an inner wall. The inner wall defines a channel. An electro-optic element is disposed in the opening and configured for reception in the channel of the inner wall.

According to another aspect of the present disclosure, a window mounting assembly includes a bezel defining an inner wall having a channel. The bezel has an attachment feature and a retention feature. The attachment feature is configured to engage the retention feature such that the bezel defines an inner opening. An electro-optic element is disposed in the inner opening and configured for reception in the channel of the inner wall.

According to yet another aspect of the present disclosure, a window mounting assembly includes a multi-piece bezel having a first portion and a second portion, the first and second portions configured to abut one another such that an inner opening is defined having an inner wall. The inner wall defines a channel. An electro-optic element is disposed in the opening and configured for reception in the channel of the inner wall.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

BRIEF DESCRIPTION OF THE DRAWINGS

In the drawings:

FIG. 1A is a front elevational view of one embodiment of an aircraft window mounting assembly;

FIG. 1B is a side cross-sectional elevational view of the aircraft window mounting assembly of FIG. 1A taken at line 1B;

FIG. 1C is a bottom plan view of the aircraft window mounting assembly of FIG. 1A;

DETAILED DESCRIPTION OF EMBODIMENTS

Figure 2:
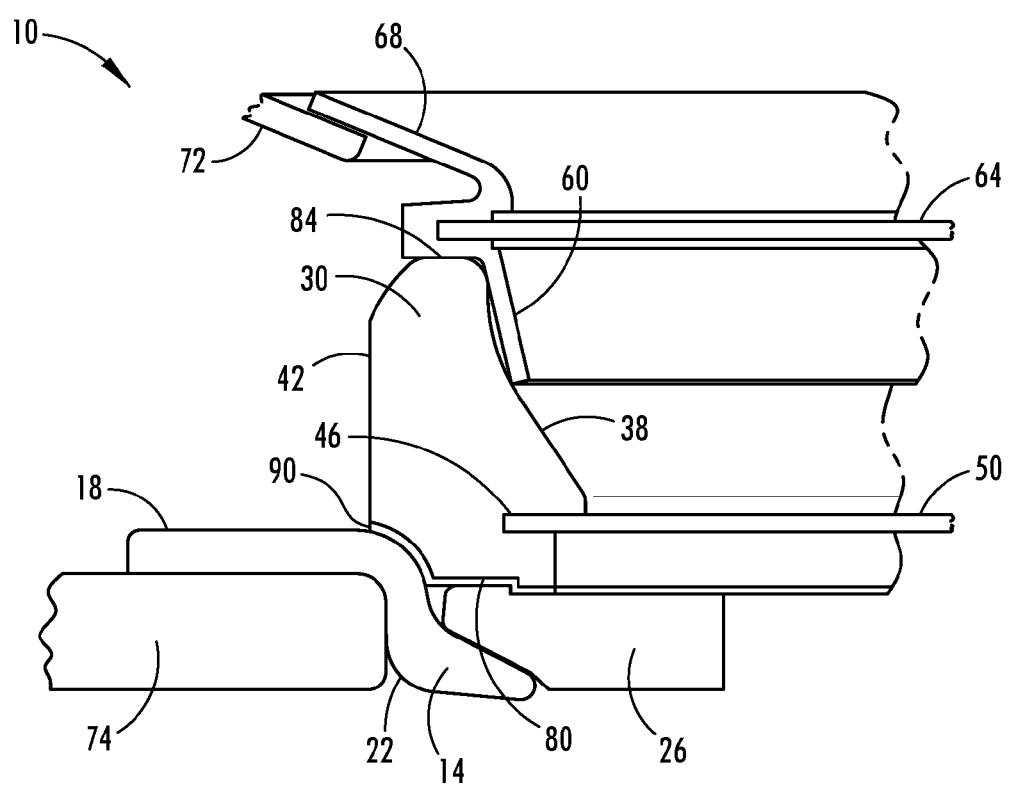
FIG. 2 is an enlarged top cross-sectional view of one embodiment of an aircraft window mounting assembly.

The present illustrated embodiments reside primarily in combinations of method steps and apparatus components related to an aircraft window. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1A-9A, reference numeral 10 generally designates a dimmable window mounting assembly for an aircraft including an exterior pressure pane frame 14 having an inner surface 18 and an outer surface 22. A pressure pane 26 is in abutting contact with the inner surface 18 of the exterior pressure pane frame 14. A bezel 30 is proximate a periphery of the pressure pane 26 and defines an inner opening 34. The bezel 30 includes an inner wall 38 and an outer wall 42. The inner wall 38 defines a channel 46. An electro-optic element 50 is disposed in the inner opening 34 and is configured for reception in the channel 46 of the inner wall 38. The electro-optic element 50 may be similar to or the same as that disclosed in U.S. Patent Application Publication No. 2013/ 0161971, which is assigned to Gentex Corporation, the entire disclosure of which is hereby incorporated herein by reference.

Referring now to FIGS. 1A-2, the bezel 30 is generally configured to nest between a middle reveal 60 and the pressure pane frame 14. The bezel 30, or foam mount, is also proximate the pressure pane 26, and in the illustrated embodiment, is in abutting contact with the pressure pane 26. The pressure pane 26 generally defines a window through which passengers in an aircraft can view outside the aircraft. The channel 46 includes a depth and width configured to receive the electro-optic element 50 therein. The electro-optic element 50 is generally disposed between the pressure pane 26 and a dust cover 64. The dust cover 64 is held in place by an inner reveal 68, which is subsequently held in place by an interior aircraft sidewall 72. The interior aircraft sidewall 72 may include an interior trim to provide an aesthetically pleasing appearance inside an aircraft fuselage.

The bezel 30 includes an exterior wall 80 configured to abut one or both of the pressure pane 26 and the pressure pane frame 14. The bezel 30 also includes an interior wall 84 configured to abut or nearly abut the middle reveal 60. The interior wall 84 may have a shorter height than the height of the exterior wall 80. Further, the interior wall 84 is generally angled upwardly from the exterior wall 80 to the interior wall 84. It should be understood that the bezel 30 cross section can differ from the illustrated embodiment. However, it will be understood that the bezel 30 secures the electro-optic element 50 in place and may be attached to, or formed in, the bezel 30. In the illustrated embodiment, the middle reveal 60 is operably coupled with the inner reveal 68 through the dust cover 64. The middle reveal 60 includes a generally L-shaped cross-section and can come in a variety of lengths. In addition, a lower transverse leg of the middle reveal 60 supports a portion of the bezel 30. An upper vertical leg couples with the inner reveal 68. The inner reveal 68 includes a V-shaped configuration with an inner leg abutting the dust cover 64 and an outer leg abutting the interior aircraft sidewall 72.

In some embodiments, the bezel 30 is configured to cooperate with the fuselage 74 of the aircraft to form an electromagnetic shield. The shield functions to prevent interfering electromagnetic signals from entering and exiting the aircraft at unintended locations. In such embodiments, the bezel 30 may include an electrically conductive member 90 configured to create an electrical connection between the electro-optic element 50 and the pressure pane frame 14 and/or pressure pane 26. The electrically conductive member 90 may take a variety of forms including both layer and/or insert configurations. In layer embodiments, such as the depicted embodiment, the electrically conductive member 90 may include a physical vapor deposition layer, a thin metal film, a conductive paint, and/or similar coatings and claddings that extend from the electro-optic element 50 to the pressure pane frame 14 on the exterior of the bezel 30. In insert embodiments, the electrically conductive member 90 may travel through the bezel 30 in the form of an electrically conductive polymer, metal wire or other conductive material. Additionally or alternatively, the conductive element 90 may be similar to or the same as that disclosed in U.S. Patent Application Publication No. 2015/ 0029574, which is assigned to Gentex Corporation, the entire disclosure of which is hereby incorporated herein by reference.

It is contemplated that the bezel 30 may take on a variety of shapes, materials, and architectures that will generally define a frame-like structure. The bezel 30 may be formed of materials that hold their shape and conform to aviation requirements relating to resistance to fire and weight. Such materials that may be used for the bezel 30 may be, for example, melamine or polyurethane. In one instance, the bezel 30 is constructed by introduction of a foaming material into a mold cavity of a low pressure molding assembly. The molding process is initiated, and the bezel 30, which may include open cell or closed cell foam, is withdrawn from the mold. The bezel 30 may comprise foam, polymers, metal, or ceramics. During the molding process, in insert embodiments of the conductive member 90, the electrically conductive member 90 may be placed in the mold to be enveloped by the foam or formed in a second shot of foam. Further, it is contemplated that the electro-optic element 50 may protrude into the bezel 30 only a small distance or may extend to the outer wall 42. The distance that the electro-optic element 50 extends into the bezel 30 will depend on the desired functionality and the desired tolerance and spacing between the inner surface 18 of the exterior pressure pane frame 14 and the electro-optic element 50.

Figure 3A:
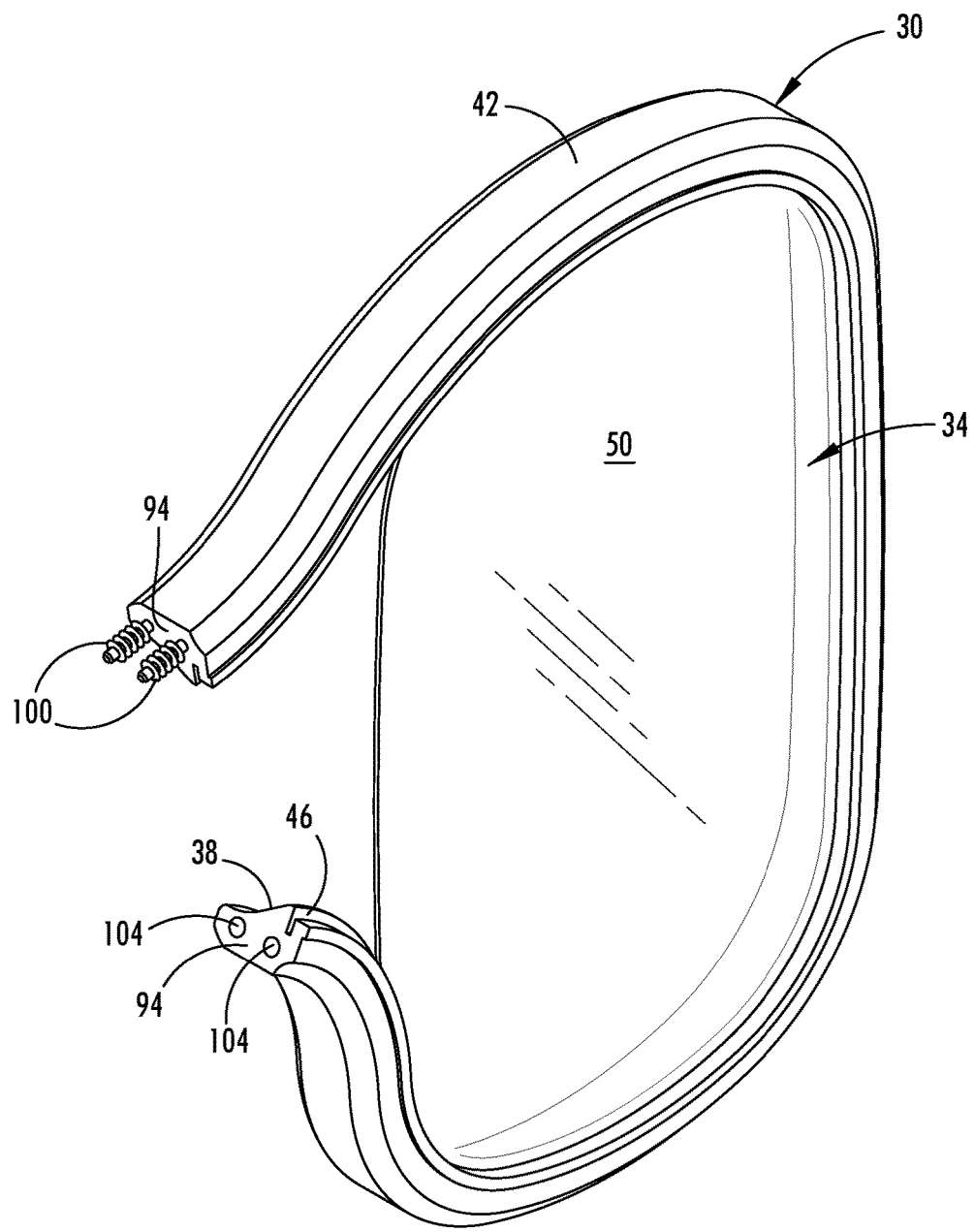
FIG. 3A is an exploded perspective view of the aircraft window mounting assembly of FIG. 1A according to one embodiment.
Figure 3B:
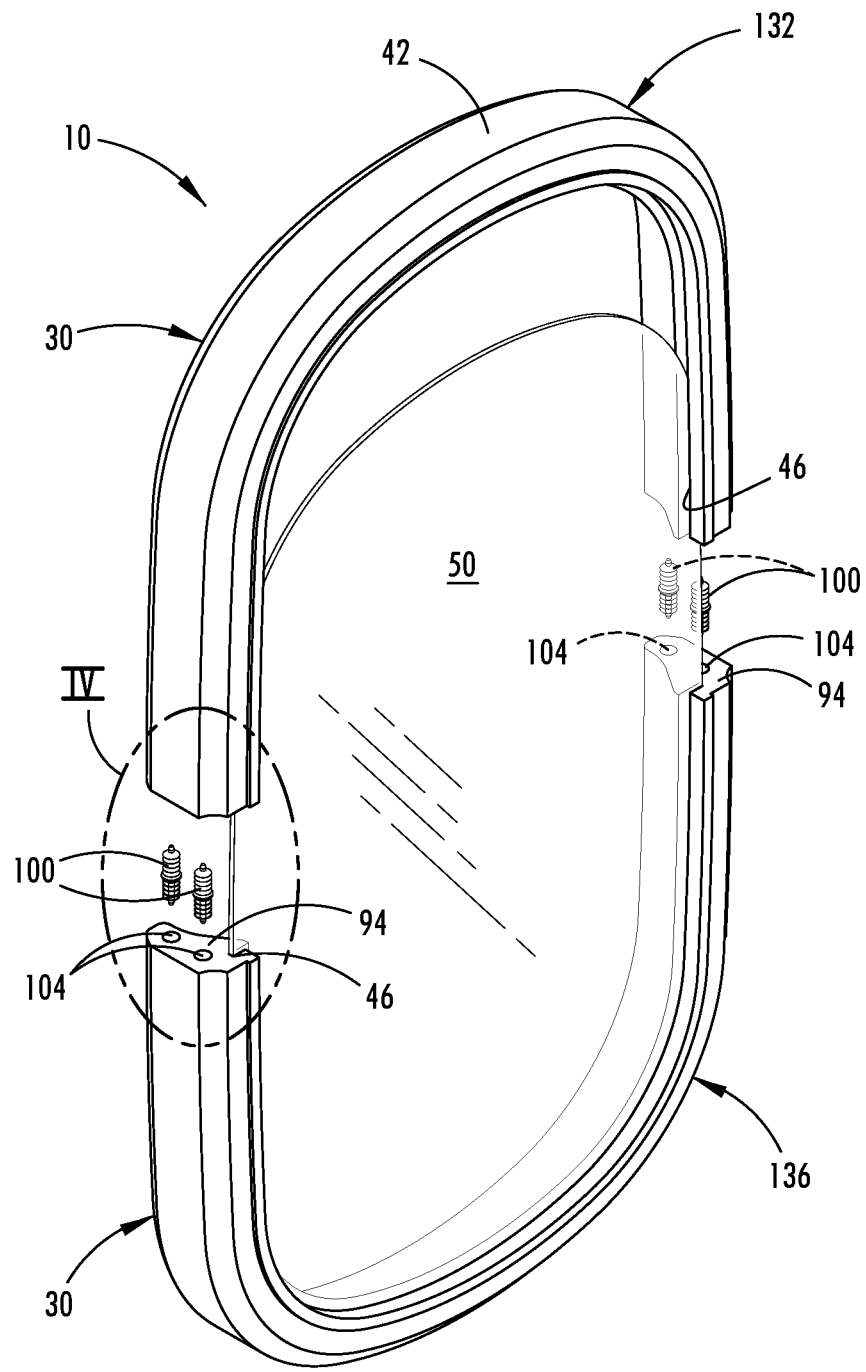
FIG. 3B is an exploded perspective view of the aircraft window mounting assembly of FIG. 1A according to another embodiment.
Figure 3C:
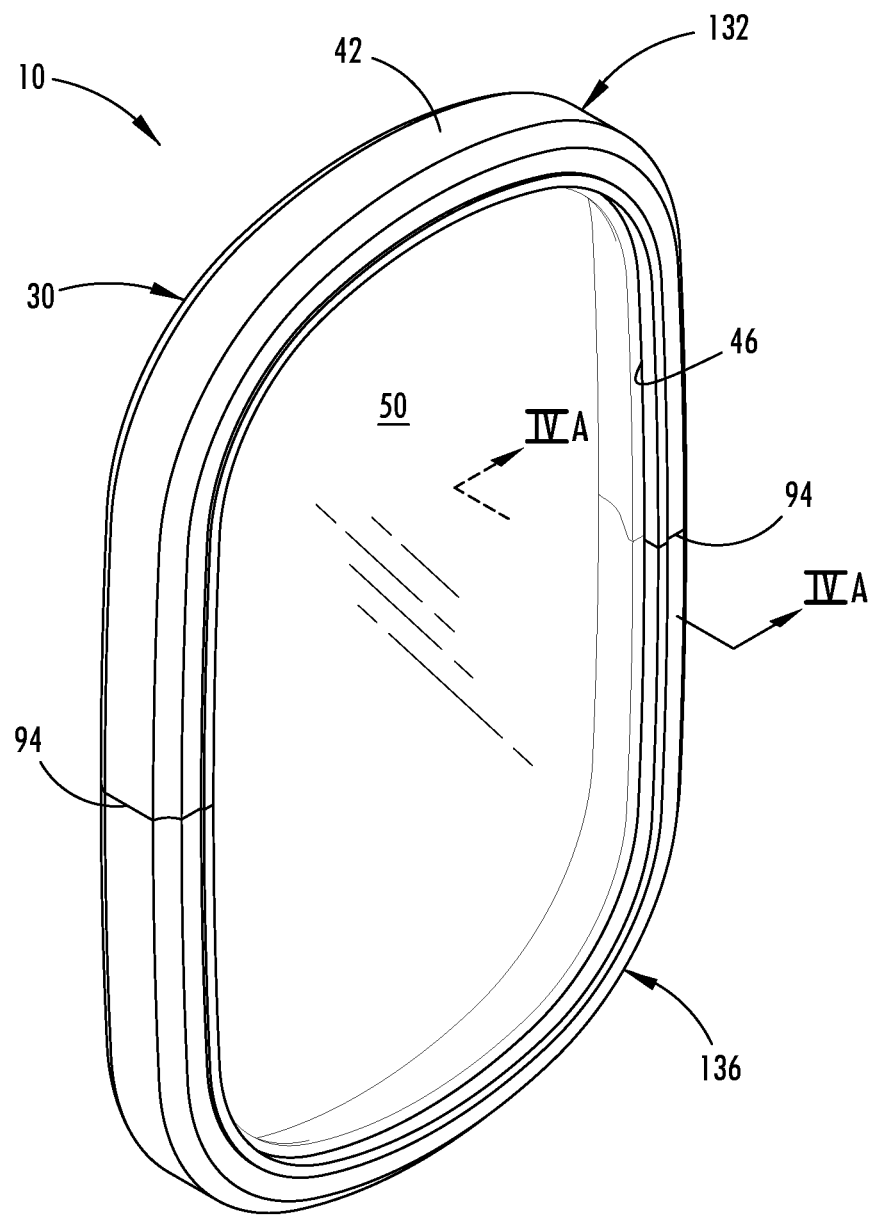
FIG. 3C is an assembled perspective view of the aircraft window mounting assembly of FIG. 1A according to a further embodiment.

Referring now to FIGS. 3A-3C, the bezel 30 may be a single unitary piece, a single discontinuous piece (FIG. 3A) or a multi-piece structure (FIG. 3B) configured to be held together to form a continuous loop. In various multi-piece embodiments, the bezel 30 may be two pieces split along the channel 46. The bezel 30, whether in a unitary or multi-piece embodiment, defines at least two engagement surfaces 94 configured to abut one another to facilitate formation of the continuous loop. In the depicted embodiments, the engagement surfaces 94 may be planes orthogonal to the length direction of the bezel 30, but may also take a variety of complimentary angles to one another. For example, the engagement surfaces 94 may each have a complimentary 45 degree angle to one another. The bezel 30 may include one or more attachment features 100 and one or more retention features 104 located at the engagement surfaces 94. The attachment features 100 and the retention features 104 are configured to engage (e.g., mechanically or electromagnetically) one another such that the bezel 30 may be held together. The attachment features 100 and retaining features 104 may take a variety of configurations designed to couple with varying degrees of retention force as explained in greater detail below. It should be understood that although the depicted embodiments of the attachment and retention features 100, 104 are located on the engagement surface 94, the features 100, 104 may additionally or alternatively be located on the outer wall 42 and/or the inner wall 38 to help secure the bezel 30 together.

Referring again to FIG. 3A, depicted is a discontinuous unitary embodiment of the bezel 30. In such an embodiment, the bezel 30 defines two engagement surfaces 94 configured to substantially abut one another. Under some assembly conditions, positioning of the electro-optic element 50 within the bezel 30 may be difficult and result in damage to the bezel 30, the electro-optic element 50, or the electrically conductive member 90. The discontinuous unitary embodiment of the bezel 30 leverages the flexibility of the bezel 30 to allow enlargement of the inner opening 34 by disengaging the engagement surfaces 94 as shown in FIG. 3A. Enlargement of the inner opening 34 allows easier positioning of the electro-optic element 50 within the channel 46 of the bezel 30, thereby decreasing the likelihood of damage to components of the dimmable window mounting assembly 10. Although the engagement surfaces 94 are depicted as coupling at a central left side location of the bezel 30, it should be understood that the engagement surfaces 94 may couple anywhere along the bezel 30. For example, the engagement surfaces 94 may couple at a top-central location, a bottom-central location, or a bottom right corner location. For example, the first and second ends may be coupled along the sides, at the corners, or at the bottom of the bezel 30.

With reference again to FIGS. 3B and 3C, the bezel 30 may alternatively be a multi-piece assembly. As illustrated, the bezel 30 includes a first portion 132 and a second portion 136, each defining two engagement surfaces 94. The engagement surfaces 94 of the multi-piece bezel 30 embodiments may be substantially similar to that of the unitary discontinuous embodiments. In multi-piece embodiments of the bezel 30, each set of engagement surfaces 94 may include attachment features 100 and retention features 104 such that the first and second portions 132, 136 may be fully united to form a continuous bezel 30. Although depicted as having two sections, it should be understood that the multi-piece embodiments of the bezel 30 may have 2 or more (e.g., 4-20) parts all having attachment features 100 and retention features 104 located on engagement surfaces 94 and configured to mate to form the bezel 30. In embodiments where the bezel 30 is separated along the channel 46, the attachment and retention features 100, 104 along with the engagement surfaces 94 may be disposed within the bezel 30 when in assembly. Additionally, multi-piece embodiments of the bezel 30 may include portions having different sizes and shapes than other portions. Further, portions of the bezel 30 (e.g., the first and second portions 132,136) may not possess reflectional symmetry with respect to the locations of the engagement surfaces 94. For example, the first portion 132 may couple to the second portion 136 along one of the sides of the bezel 30 and along the top of the bezel 30. In the depicted embodiment, the first portion 132 and the second portion 136 are approximately equal in size and shape and are configured to couple along both sides of the bezel 30.

Similar to the discontinuous unitary embodiment of the bezel 30, multi-piece embodiments of the bezel 30 may be advantageous for installation of the electro-optic element 50 into the bezel 30. In such embodiments, the electro-optic element 50 may be placed in one of the portions (e.g., the second portion 136) of the bezel 30 and then have another portion (e.g., the first portion 132) placed on the remaining exposed portion of the electro-optic element 50. In embodiments having a large number of portions (e.g., greater than 4), the bezel 30 may be "built" around the electro-optic element 50 piece by piece by serially connecting each piece to one another around the electro-optic element 50. The multi-piece embodiments of the bezel 30 offer similar advantages over conventional assembly techniques as that of the discontinuous unitary embodiment, namely, easier assembly and decreased risk of damage to the dimmable window mounting assembly 10. Once the attachment features 100 have engaged the retention features 104, the engagement surfaces 94 of the bezel 30 are pressed together such that the bezel 30 become a continuous structure. The location of the engagement surfaces 94 may or may not be apparent.

Figures 4, 4A:
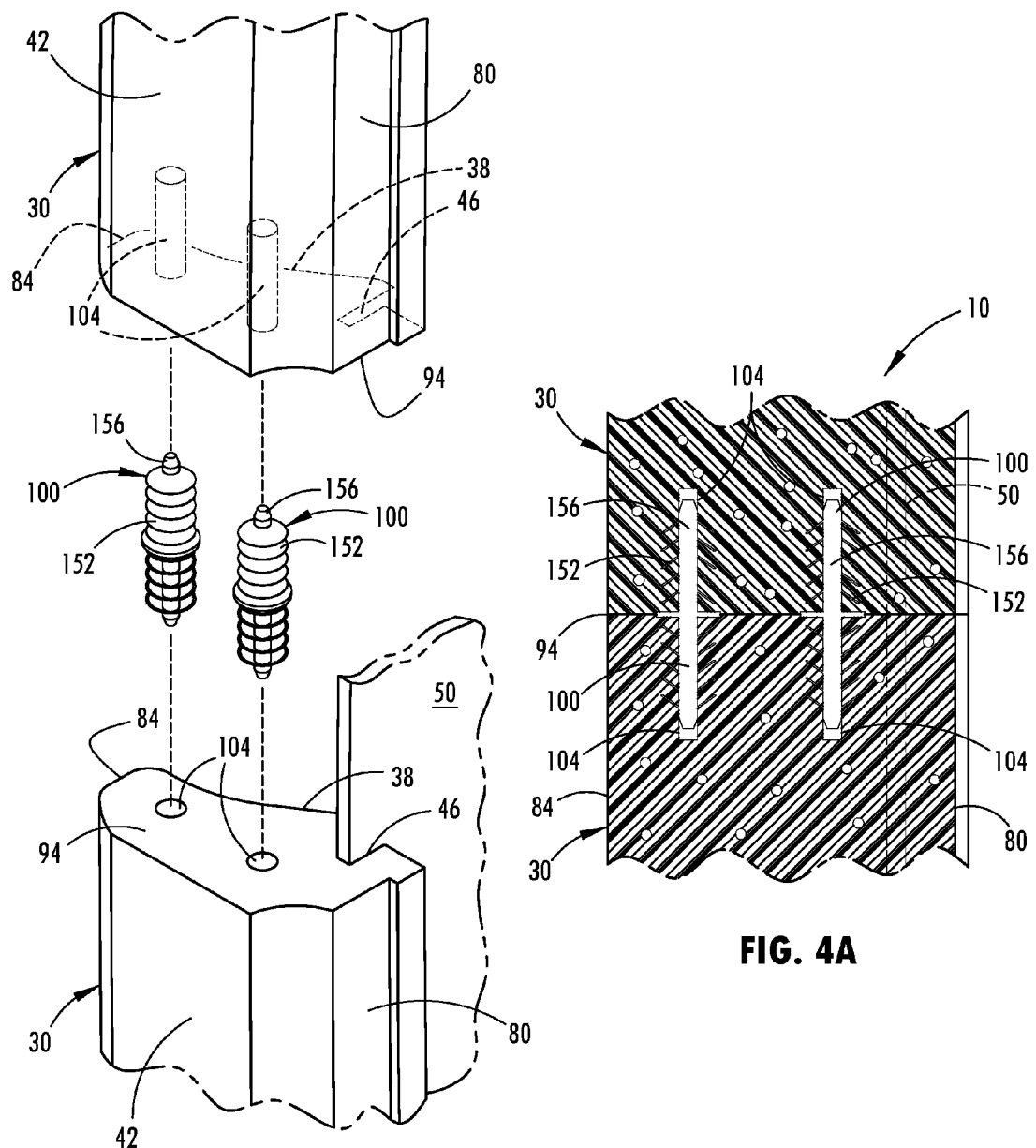
FIG. 4 is an enlarged partially exploded perspective view of the aircraft window mounting assembly, in accordance with one aspect of the disclosure.
FIG. 4A is an enlarged cross-sectional view of the aircraft window mounting assembly taken along line 4A of FIG. 3C, in accordance with the embodiment of FIG. 4.

Referring now to the depicted embodiment of FIGS. 4 and 4A, the attachment features 100 may include a barbed fastener having opposing or dual "Christmas tree" or barbed nipple configuration. As illustrated, the attachment features 100 may have a plurality of barbs 152 extending outward from an axis of a stem 156. The barbs 152 extend away from the stem 156 at an angle configured to allow easy insertion of the attachment feature 100 into the retention feature 104, but cause resistance to the removal of the attachment feature 100 from the retaining feature 104. The angle and size of the barbs 152 may be altered to adjust the force required to separate the attachment feature 100 from the retaining feature 104 (i.e., pull apart the bezel 30). In the depicted embodiment, the barbs 152 are continuous and swept around the stem 156 of the features 100. In other embodiments, the barbs 152 are thin projections extending away from the stem 156. As illustrated, the retention features 104 may be a simple aperture defined by the bezel 30 or may be inserts having a complex geometry configured to couple with the barbs 152 of the barbed attachment feature 100. In yet other embodiments, one of the bezel 30 may integrally define the barbed embodiment of the attachment feature 100, optionally with a denser or more rigid foam. Additionally, the barbed attachment feature 100 may be used in conjunction with an adhesive to ensure retention of the attachment feature 100 within the retention feature 104.

Figures 5, 5A:
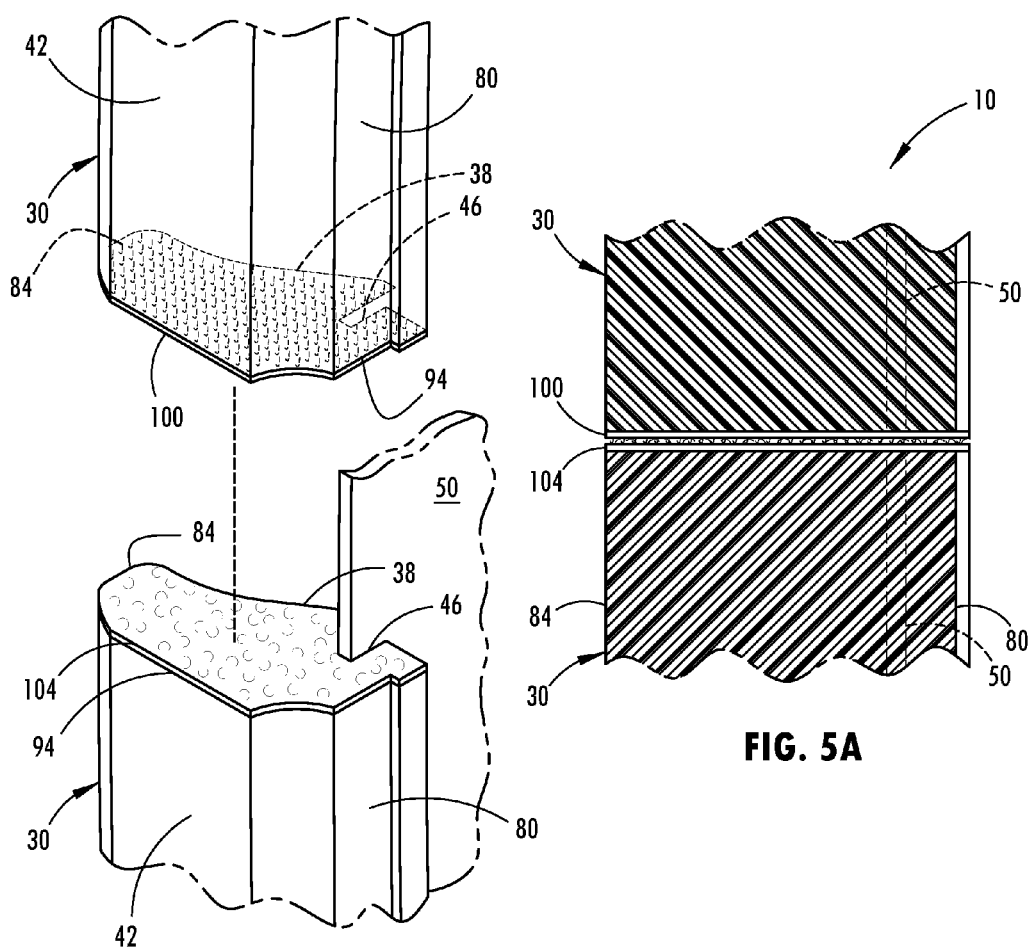
FIG. 5 is an enlarged partially exploded perspective view of the aircraft window mounting assembly, in accordance with another aspect of the disclosure.
FIG. 5A is an enlarged cross-sectional view of the aircraft window mounting assembly taken along line 4A of FIG. 3C, in accordance with the embodiment of FIG. 5.

Referring now to FIGS. 5 and 5A, alternatively, the attachment feature 100 and the retention feature 104 may each be one side of a hook and loop system (e.g., Velcro®). The attachment feature 100 and the retention feature 104 may be secured to the bezel 30 in a variety of manners including adhesively, heat bonding, mechanical coupling, or other suitable methods. Both high strength industrial grade and household grades of hook and loop systems may suffice. Additionally, unidirectional models of hook and loop systems may also be used. Hook and loop products having an adhesive backsliding may be advantageous as it allows for quick positioning and attachment to the bezel 30. The hook and loop systems may be low profile or a normal profile based on the desired distance between the engagement surfaces 94 of the bezel 30. Due to the ease of use of hook and loop systems, the bezel 30 may easily be repositioned or separated in order to correct alignment of the electro-optic element 50 within the dimmable window mounting assembly 10.

Figures 6, 6A:
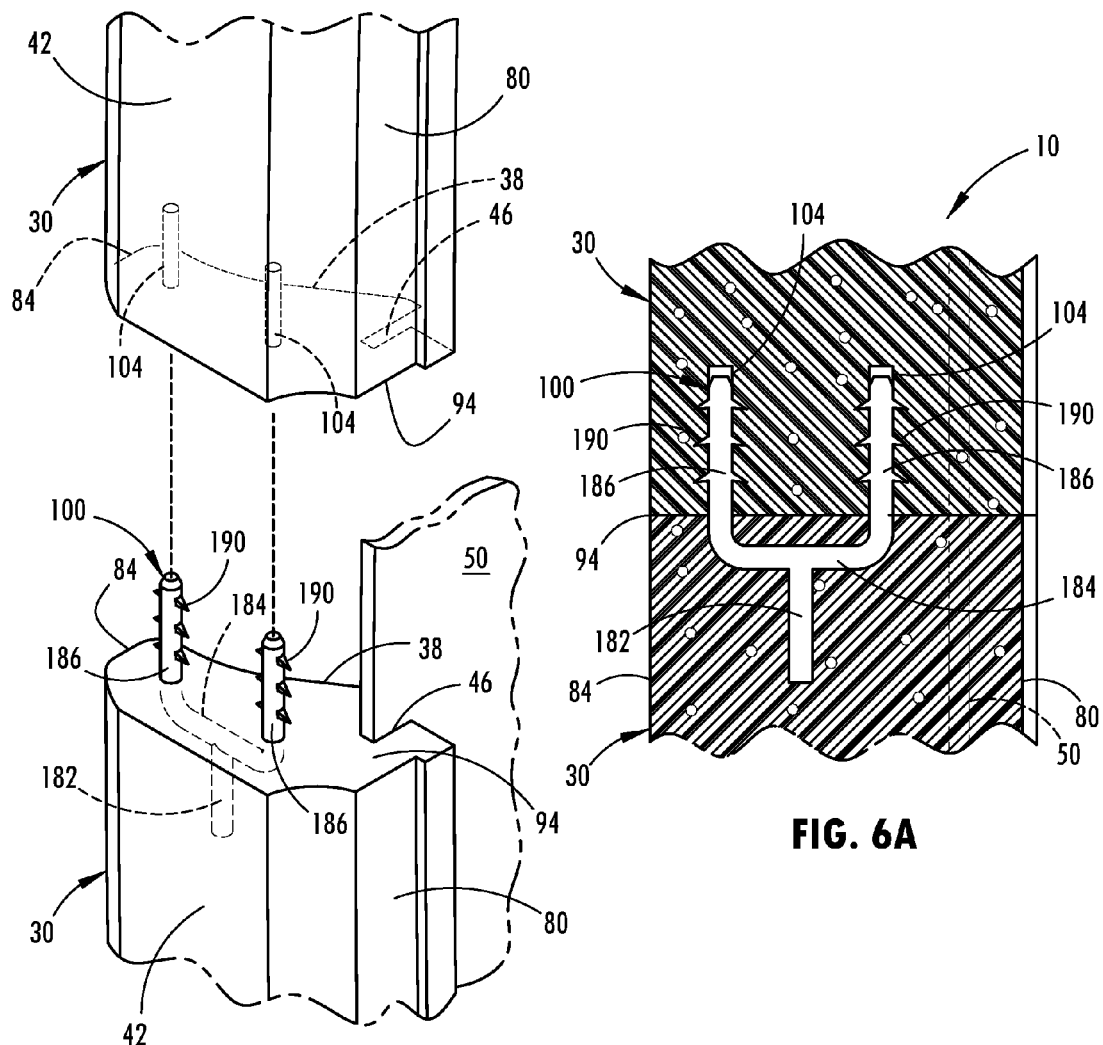
FIG. 6 is an enlarged partially exploded perspective view of the aircraft window mounting assembly, in accordance with another aspect of the disclosure.
FIG. 6A is an enlarged cross-sectional view of the aircraft window mounting assembly taken along line 4A of FIG. 3C, in accordance with the embodiment of FIG. 6.

Referring now to FIGS. 6 and 6A, the attachment feature 100 may be configured as a dual pronged connector having a "goal post" type configuration. The dual pronged connector may have a stem 182 attached to a body 184. Extending from the body 184 are two or more prongs 186. Each of the prongs 186 defines one or more points 190 which extend outwardly from the prongs 186. Additionally or alternatively, the stem 182 may also define points 190. The prongs 186 are configured (e.g., via size, shape, location) to be received within the retaining features 104 of the bezel 30. In the depicted embodiment, the retaining features 104 are simple columnar holes defined in the bezel 30, but may also include features configured to engage the points 190. In some embodiments, the retaining features 104 are provided and the prongs of the attachment feature 100 are inserted directly into the bezel 30. The dual pronged attachment feature 100 is depicted as having the body 184 disposed within the bezel 30. Such an embodiment may be advantageous in that it would resist the pulling out of the attachment feature 100 from the retaining features 104 when a tension force is applied to the bezel 30. It should be noted that an adhesive material may be applied to the prongs 186 to facilitate a stronger bond between the attachment feature 100 and the retention features 104 or the bezel 30. It should be understood that various components of this embodiment of the attachment feature 100 (e.g., stem 182, body 184, and/or prongs 186) may be integrally defined by the bezel 30.

Figures 7, 7A:
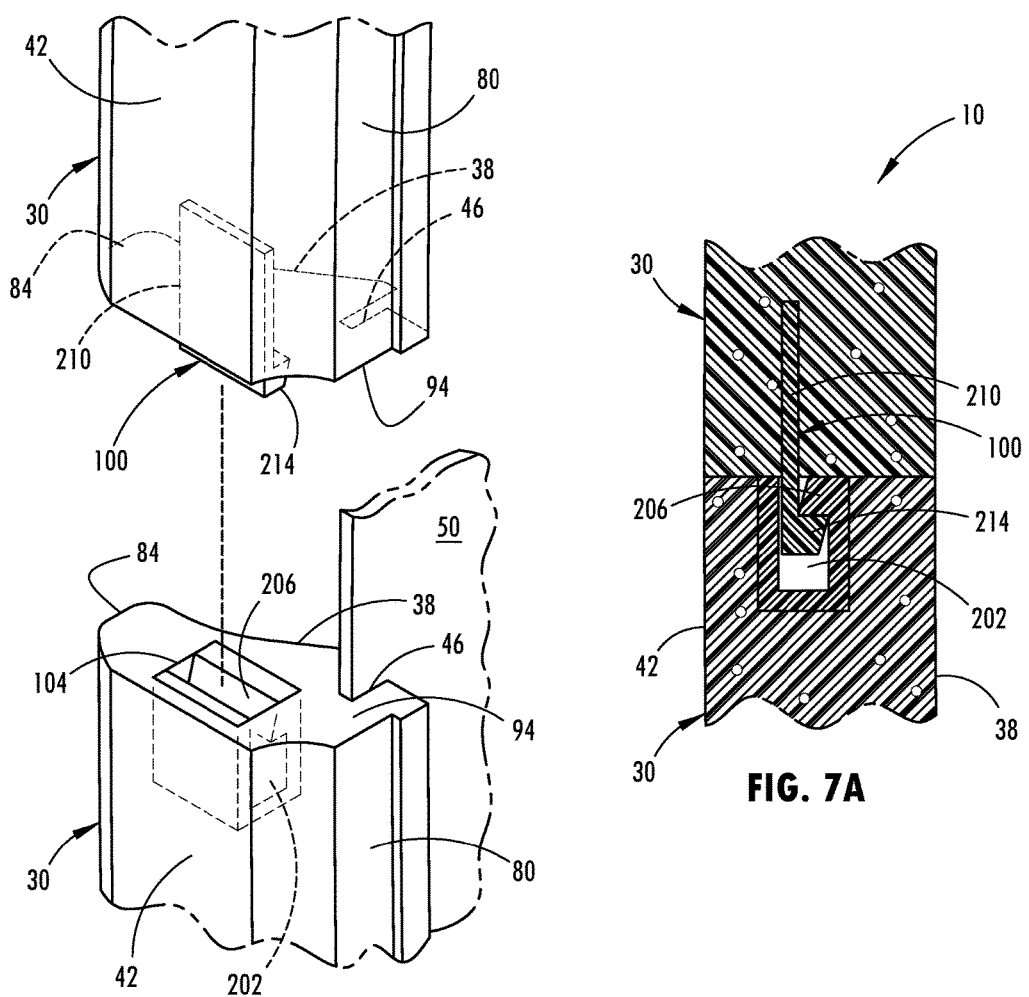
FIG. 7 is an enlarged partially exploded perspective view of the aircraft window mounting assembly, in accordance with another aspect of the disclosure.
FIG. 7A is an enlarged cross-sectional view of the aircraft window mounting assembly taken along line 4A of FIG. 3C, in accordance with the embodiment of FIG. 7.

Referring now to FIGS. 7 and 7A, the attachment feature 100 and the retention feature 104 are depicted in a "hook on hook" embodiment. The retention feature 104 may be a pre-manufactured piece insertable into the bezel 30 or may be integrally defined by the bezel 30. The retaining feature 104 defines a cavity 202 over which a lip 206 extends. In alternative embodiments, the lip 206 and cavity 202 may be integrally defined by the bezel 30. The attachment feature 100 includes an elongated portion 210 which extends into the bezel 30. The elongated portion 210 may include barbs, points or tines configured to grip the bezel 30 providing a more secure connection to the bezel 30. Optionally, the elongated portion may be secured to the bezel 30 using an adhesive. Located at a distal end exterior to the bezel 30 of the elongated portion 210 is a hook 214.

In operation, the engagement surfaces 94 of the bezel 30 are configured to be united by inserting the hook 214 into the cavity 202 such that a snap-fit is achieved between the attachment feature 100 and the retention feature 104. The hook 214 and the lip 206 may engage one another in a substantially horizontal position as depicted, or may alternatively engage one another at an angle up or down relative to the depicted embodiment. Such angling may increase the retention force (e.g., by angling the hook 214 up and the lip 206 down) or decrease the retention force (e.g., by angling the hook 214 down and the lip 206 up). The attachment feature 100 and the retention feature 104 may be made from a polymer, metal, or composite material configured to flex under stress. In some embodiments, the material may be a composite, or one feature (e.g., the attachment feature 100) may be constructed of metal and the other feature (e.g., the retention feature 104) may be constructed of a polymer. The flexibility of the material, as well as angling of the hook 214 and lip 206, allows the attachment and retention features 100, 104 to disengage at a predetermined stress level. Setting a predetermined disengaging stress level may be advantageous for allowing repositioning of the electro-optic element 50 within the bezel 30 should an issue arise during assembly of the dimmable window mounting assembly 10.

In another embodiment, the attachment feature 100 may have a second elongated portion having a second hook substantially similar in shape to that of the elongated portion 210 and the hook 214. In this embodiment, the hook 214 and the second hook are bridged such that the elongated portion 210 and the second elongated portion form a "V" shape within the bezel 30. In this embodiment, the retaining feature 104 defines a second lip configured to engage the second hook. In operation, the attachment feature 100 is inserted into the retaining feature 104 such that the hook 214 and the second hook engage the lip 206 and the second lip, respectively. The elongated portion 210 and the second elongated portion may be pinched toward one another through the bezel 30 to disengage the hook 214 and the second hook from the lip 206 and the second lip should repositioning of the bezel 30 engagements surfaces 94 be necessary.

Figures 8, 8A:
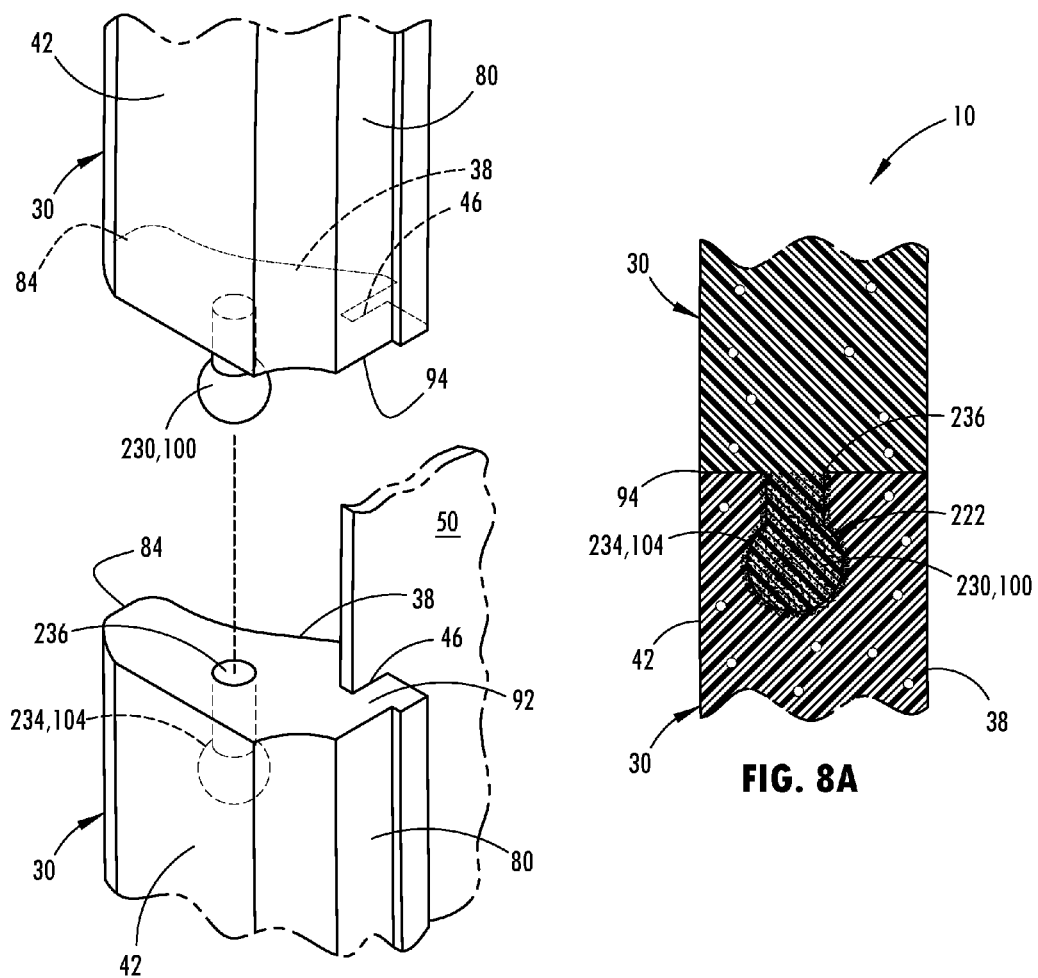
FIG. 8 is an enlarged partially exploded perspective view of the aircraft window mounting assembly, in accordance with another aspect of the disclosure.
FIG. 8A is an enlarged and a cross-sectional view of the aircraft window mounting assembly taken along line 4A of FIG. 3C, in accordance with the embodiment of FIG. 8.

With reference to FIGS. 8 and 8A, the bezel 30 may integrally define both the attachment feature 100 and the retention feature 104. In the depicted embodiment, the first and second ends of the bezel 30 include engagement regions 222 integrally formed with the bezel 30. The engagement regions 222 may be denser, stronger, or more rigid than the rest of the bezel 30. In some embodiments, the difference in properties between the engagement regions 222 and the bezel 30 may be due to a compositional difference in the makeup of the foam as compared to the rest of the bezel 30. For example, the engagement regions may be formed of a different polymeric foam approved for aircraft than the rest of the bezel 30. In other embodiments, the material of the engagement regions 222 may include the same foam composition as the rest of the bezel 30, but processed differently. For example, the engagement regions 222 may be denser and more rigid due to less expansion of the foam, or due to compaction of a localized region (e.g., the engagement surfaces 94 or attachment and retention features 100, 104).

With reference once again to the embodiment generally illustrated in FIGS. 8 and 8A, the engagement surfaces 94 may integrally define the attachment feature 100 and the retention feature 104. In the depicted embodiment, the attachment feature 100 defines a ball 230 configured to be accepted in a socket 234. An aperture 236 is positioned proximate the socket 234 and is configured to be slightly smaller in diameter than the ball 230 is in diameter. As the ball 230 is pressed into the aperture 236, the aperture 236 expands to accept the ball 230. The rigidity of the attachment feature 100 and the retention feature 104, when integrally formed from the engagement surfaces 94, may allow for the ball 230 to pop into the socket 234 and retain it in a snap-fit construction. In the depicted embodiment, the ball 230 and the socket 234 are also held together with an adhesive. By integrally defining the attachment and retention features 100, 104 from the bezel 30, the total part count, and possibly the weight, of the dimmable window mounting assembly 10 is brought down. Additionally, the likelihood of operator error in placement and fastening of the attachment and retention features 100, 104 is reduced.

Figures 9, 9A:
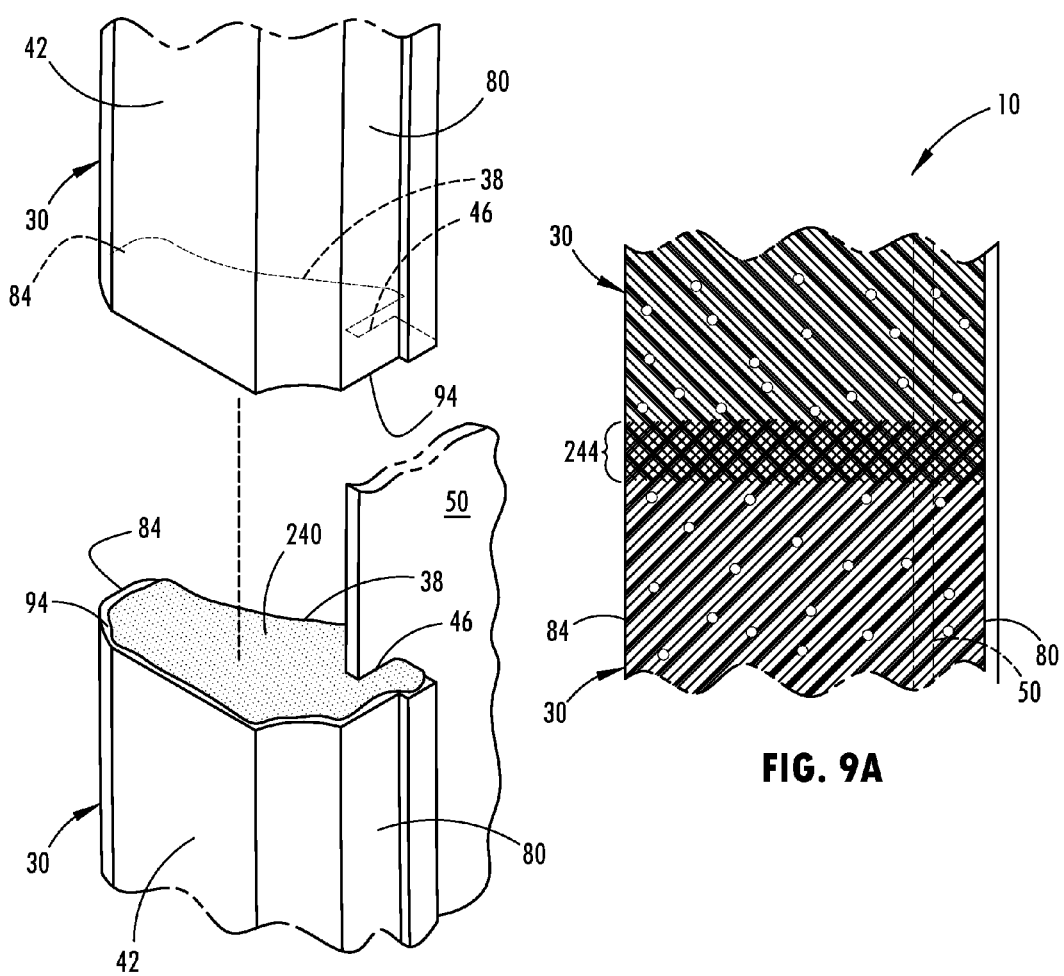
FIG. 9 is an enlarged partially exploded perspective view of the aircraft window mounting assembly, in accordance with another aspect of the disclosure.
FIG. 9A is an enlarged cross-sectional view of the aircraft window mounting assembly taken along line 4A of FIG. 3C, in accordance with the embodiment of FIG. 9.

With reference now to FIGS. 9 and 9A, some embodiments of the bezel 30 do not include attachment features 100 and retention features 104; rather, the engagement surfaces 94 of the bezel 30 may be joined using a chemical agent 240. According to one embodiment, the chemical agent 240 used to fuse the engagement surfaces 94 of the bezel 30 may be a solvent in which the material of the bezel 30 is soluble. Exemplary solvents include acetone, gasoline, alcohols, methyl ethyl ketone, and other hydrocarbon based liquids and gases. In liquid solvent embodiments of the chemical agent 240, the solvent may have a relatively high evaporation rate to facilitate quick drying of the solvent and removal from the bezel 30. In operation, at least one of the engagement surfaces 94 may have the solvent chemical agent 240 applied thereto to facilitate liquefying, partial liquefying, or softening of the bezel 30. Once the solvent has been applied, engagement surfaces 94 may be pressed together to cause mixing and bonding of the engagement surfaces 94, thereby forming a fused area 244 where the ends of the bezel 30 have become one. Alternatively, the engagement surfaces 94 of the bezel 30 may be forced to abut one another as the solvent is poured over the engagement surfaces 94, thereby dissolving and mixing the engagement surfaces 94 to form the fused area 244. After formation of the fused area 244, the bezel 30 may optionally be heated to evaporate any solvent chemical agent 240 remaining.

In another embodiment, the chemical agent 240 may be an adhesive applied to one or both of the engagement surfaces 94 of the bezel 30. Exemplary adhesives include cyanoacrylate adhesives, epoxy adhesives, hot melt adhesives, light curing adhesives, polyurethane adhesives, and silicone adhesives. In some embodiments, the chemical agent 240 is a pressure sensitive adhesive. Additionally, the engagement surfaces 94 may be treated with a primer prior to application of adhesive embodiments of the chemical agent 240. In yet other embodiments, the engagement surfaces 94 of the bezel 30 may be heated (e.g., with a heat gun or a hot plate) to a softening point and pressed together to facilitate fusion and bonding of the bezel 30.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A window mounting assembly, comprising:
    a multi-piece bezel comprising:
        a first portion having an attachment feature, and
        a second portion having a retention feature configured to engage the attachment feature such that an inner opening is defined having an inner wall, wherein the inner wall defines a channel;
    wherein the multi-piece bezel is configured to couple to an aircraft pressure pane and an aircraft pressure pane frame; and
    an electro-optic element disposed in the opening and configured for reception in the channel of the inner wall.

2. The window mounting assembly of claim 1, wherein the attachment feature and the retention feature are configured to engage in a snap-fit configuration.

3. The window mounting assembly of claim 1, wherein the attachment feature is integrally defined by the bezel.

4. The window mounting assembly of claim 1, wherein the attachment feature includes an elongated portion having a hook and the retention feature defines a cavity and a lip, further wherein the hook is configured to engage the cavity and lip.

5. The window mounting assembly of claim 1, wherein the attachment feature has a barbed configuration.

6. The window mounting assembly of claim 1, wherein the attachment feature and the retention feature are each one half of a hook and loop system.

7. A window mounting assembly, comprising:
    a bezel defining an inner wall having a channel, wherein the bezel has an attachment feature and a retention feature, the attachment feature configured to engage the retention feature such that the bezel defines an inner opening, wherein the bezel is configured to couple to an aircraft pressure pane and an aircraft pressure pane frame; and
    an electro-optic element disposed in the inner opening and configured for reception in the channel of the inner wall.

8. The window mounting assembly of claim 7, wherein the attachment feature and the retention feature are configured to engage in a snap-fit configuration.

9. The window mounting assembly of claim 7, wherein the retention feature is integrally defined by the bezel.

10. The window mounting assembly of claim 7, wherein the attachment feature includes an elongated portion having a hook and the retention feature defines a cavity and a lip, further wherein the hook is configured to engage the cavity and lip.

11. The window mounting assembly of claim 7, wherein the attachment feature has a barbed configuration.

12. The window mounting assembly of claim 7, wherein the attachment feature and the retention feature are each one half of a hook and loop system.

13. A window mounting assembly, comprising:
a multi-piece bezel having a first portion and a second portion, the first and second portions configured to abut one another such that an inner opening is defined having an inner wall, wherein the inner wall defines a channel, wherein the multi-piece bezel is configured to couple to an aircraft pressure pane and an aircraft pressure pane frame; and
an electro-optic element disposed in the opening and configured for reception in the channel of the inner wall.

14. The window mounting assembly of claim 13, wherein the first and second portions are fused together.

15. The window mounting assembly of claim 13, wherein the bezel includes an attachment feature and a retention feature.

16. The window mounting assembly of claim 15, wherein the attachment feature and the retention feature are configured to engage in a snap-fit configuration.

17. The window mounting assembly of claim 16, wherein the retention feature is integrally defined by the bezel.

18. The window mounting assembly of claim 15, wherein the attachment feature and the retention feature are each one half of a hook and loop system.

* * * * *